(12) United States Patent
Koda et al.

(10) Patent No.: US 6,257,859 B1
(45) Date of Patent: Jul. 10, 2001

(54) HYDRAULIC CIRCUIT OF AN INJECTION MOLDING MACHINE

(75) Inventors: Toshiyasu Koda; Mamoru Miyagawa, both of Nagano (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 0 days.

(21) Appl. No.: 09/488,541

(22) Filed: Jan. 21, 2000

(30) Foreign Application Priority Data

Jan. 25, 1999 (JP) .................................................... 11-15519
Jan. 25, 1999 (JP) .................................................... 11-15520

(51) Int. Cl.[7] .................................................. B29C 45/82
(52) U.S. Cl. .......................................... 425/145; 425/149
(58) Field of Search .................................... 425/145, 149, 425/150

(56) References Cited

U.S. PATENT DOCUMENTS

| 5,641,523 | * | 6/1997 | Shioiri et al. | .................... | 425/145 |
| 5,688,535 | * | 11/1997 | Koda et al. | ..................... | 425/149 |
| 5,756,019 | * | 5/1998 | Nakazawa et al. | .................... | 425/149 |
| 5,814,251 | * | 9/1998 | Arai et al. | ............................. | 425/145 |
| 6,183,682 | * | 2/2001 | Shimizu et al. | ..................... | 425/149 |

FOREIGN PATENT DOCUMENTS 6246800   6/1994   (JP) .

* cited by examiner

Primary Examiner—Tim Heitbrink

(57) ABSTRACT

A hydraulic circuit of an injection molding machine includes a 4-port servo valve having A, B, P, and T ports and adapted to drive and control an injection cylinder. The A and B ports are connected respectively to the front and rear oil chambers of the injection cylinder. The P port is connected to a hydraulic power unit. The T port is connected to an oil tank via a shutoff valve for selecting a regular mode or a differential mode. The T port is connected to the rear oil chamber via the logic valve. Alternatively, the rear oil chamber is connected to a hydraulic power unit side via the servo valve; the front oil chamber is connected to an oil tank via the shutoff valve; and the front oil chamber is connected to the P port of the servo valve via the logic valve. The above configuration eliminates or simplifies an additional braking circuit. Also, proper and accurate braking control can be performed.

7 Claims, 4 Drawing Sheets

HYDRAULIC CIRCUIT OF AN INJECTION MOLDING MACHINE

BACKGROUND OF THE INVENTION

1. Field of the Invention

The present invention relates to a hydraulic circuit of an injection molding machine having a differential mode in which drain oil ejected from an injection cylinder during injection is utilized as working fluid.

2. Description of the Relevant Art

Japanese Patent Application Laid-Open (kokai) No. 6 (1994)-246800 discloses a conventional hydraulic circuit of an injection molding machine which permits selection of either a regular mode or a differential mode. In the regular mode, all drain oil ejected from a front oil chamber of an injection cylinder during injection is returned to an oil tank. In the differential mode, all or a portion of drain oil is supplied to a rear oil chamber of the injection cylinder. FIG. 4 schematically shows a simplified block diagram of a conventional hydraulic circuit 50 for the purpose of illustrating the principle of the hydraulic circuit 50.

In FIG. 4, when a mode selector valve 51 is changed over to a right-side position marked with symbol R (hereinafter referred to as the R position), the regular mode is established. Working fluid discharged from a hydraulic power unit 52 during injection is supplied via a main circuit 53 to a rear oil chamber 61r of an injection cylinder 61 of an injection molding machine 60. All drain oil ejected from a front oil chamber 61f is returned to an oil tank 54 via the mode selector valve 51 set in the R position and the main circuit 53.

When the mode selector valve 51 is changed over to a left-side position marked with symbol L (hereinafter referred to as the L position), a differential mode is established. Working fluid discharged from the hydraulic power unit 52 during injection is supplied to the rear oil chamber 61r of the injection cylinder 61 via the main circuit 53. Drain oil ejected from the front oil chamber 61f flows through the mode selector valve 51 set in the L position and merges with working fluid from the main circuit 53. The resultant mixture is supplied to the rear oil chamber 61r of the injection cylinder 61. In the differential mode, drain oil ejected from the injection cylinder 61 is utilized as working fluid without being returned to the oil tank 54, thereby enabling injection at a relatively high flow rate of working fluid without an increase in the amount of working fluid supplied from the hydraulic power unit 52, and thus implementing an increase in injection speed, a reduction in the size of an oil line, and prevention of impact pressure.

However, in spite of yielding of the above advantages through selection of the differential mode, the hydraulic circuit 50 having the differential mode yields the following disadvantage. Even when the supply of working fluid from the main circuit 53 is stopped, drain oil ejected from the front oil chamber 61f circulates directly to the rear oil chamber 61r due to inertia of a piston of the injection cylinder 61. As a result, at the time of stoppage of injection, braking control cannot be performed precisely and accurately. For precise, accurate braking, the conventional hydraulic circuit requires an additional braking circuit, resulting in an increase in the number of components of the hydraulic circuit and an associated increase in manufacturing cost. Also, control becomes complicated and unstable.

SUMMARY OF THE INVENTION

An object of the present invention is to provide a hydraulic circuit of an injection molding machine capable of eliminating or simplifying an additional braking circuit to thereby reduce the number of components and manufacturing cost thereof and capable of facilitating and stabilizing control.

Another object of the present invention is to provide a hydraulic circuit of an injection molding machine capable of performing precise, accurate braking control to thereby drastically improve molding quality.

To achieve the above objects, the present invention provides a hydraulic circuit of an injection molding machine permitting selection of either a regular mode, in which all drain oil ejected from a front oil chamber of an injection cylinder during injection is returned to an oil tank, or a differential mode, in which all or a portion of the drain oil is supplied to a rear oil chamber of the injection cylinder during injection. The hydraulic circuit comprises a 4-port servo valve having A, B, P, and T ports and adapted to drive and control the injection cylinder; a shutoff valve for selecting the regular mode or the differential mode; and a logic valve. The A and B ports of the servo valve are connected to the front oil chamber and the rear oil chamber, respectively, of the injection cylinder. The P port of the servo valve is connected to a hydraulic power unit. The T port of the servo valve is connected to the oil tank via the shutoff valve. The T port is also connected to the rear oil chamber of the injection cylinder via the logic valve.

When the shutoff valve is opened, the regular mode is established, so that the T port of the servo valve communicates with the oil tank via the shutoff valve. During injection in the regular mode, working fluid from the hydraulic power unit is supplied to the rear oil chamber of the injection cylinder of the injection molding machine via the servo valve. All drain oil ejected from the front oil chamber of the injection cylinder is returned to the oil tank via the shutoff valve. When the shutoff valve is closed, the differential mode is established. During injection in the differential mode, working fluid from the hydraulic power unit is supplied to the rear oil chamber of the injection cylinder via the servo valve. Drain oil ejected from the front oil chamber flows through the logic valve and then merges with working fluid from the hydraulic power unit. The resultant mixture is supplied to the rear oil chamber of the injection cylinder. At the time of stoppage of injection, a regular injection stoppage is performed by means of the servo valve. Since drain oil ejected from the front oil chamber of the injection cylinder is supplied to the rear oil chamber via the servo valve, which constitutes a meter-out circuit, the servo valve serves also as a braking circuit.

The present invention further provides a hydraulic circuit of an injection molding machine permitting selection of either a regular mode, in which all drain oil ejected from a front oil chamber of an injection cylinder during injection is returned to an oil tank, or a differential mode, in which all or a portion of the drain oil is supplied to a rear oil chamber of the injection cylinder during injection. The hydraulic circuit comprises a servo valve, a shutoff valve, and a logic valve. The rear oil chamber of the injection cylinder is connected to a hydraulic power unit side via the servo valve. The front oil chamber of the injection cylinder is connected to the oil tank via the shutoff valve. The front oil chamber is connected to a P port of the servo valve via the logic valve.

In the regular mode, the shutoff valve is opened, so that the front oil chamber of the injection cylinder communicates with the oil tank via the shutoff valve, and a selector circuit is changed over so as to close the logic vale. Accordingly, during injection, working fluid from the hydraulic power unit is supplied to the rear oil chamber of the injection cylinder via the servo valve, and all drain oil ejected from the front oil chamber is returned to the oil tank. In the differential mode, the shutoff valve is closed, and the selector circuit is changed over so as to permit opening of the logic valve. Accordingly, during injection, working fluid from the hydraulic power unit is supplied to the rear oil chamber of the injection cylinder via the servo valve. Drain oil ejected from the front oil chamber flows through the logic valve and then merges with working fluid from the hydraulic power unit. The resultant mixture is supplied to the rear oil chamber of the injection cylinder via the servo valve. At the time of stoppage of injection, a regular injection stoppage is performed by means of the servo valve. Since drain oil ejected from the front oil chamber of the injection cylinder is supplied to the rear oil chamber via the servo valve, the servo valve serves also as a braking circuit.

DETAILED DESCRIPTION OF THE PREFERRED EMBODIMENTS

Embodiments of the present invention will next be described in detail with reference to the drawings. The accompanying drawings are illustrative of the embodiments and are not meant to limit the scope of the invention. In order to describe the invention clearly, detailed description of known parts is omitted.

Figure 1:
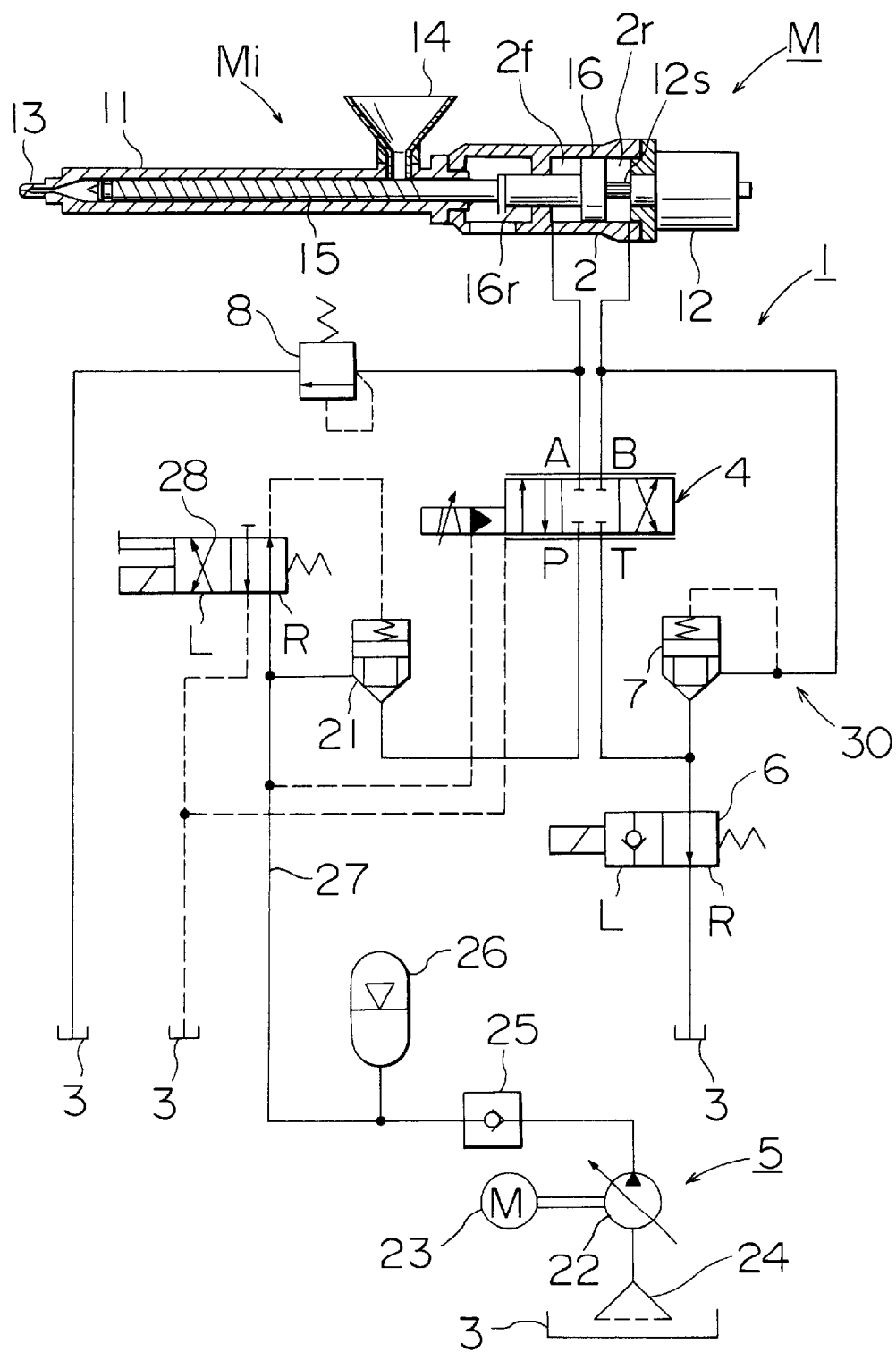
FIG. 1 is a block diagram of a hydraulic circuit according to a first embodiment of the present invention.

FIG. 1 shows a hydraulic circuit 1 of an injection molding machine M according to a first embodiment of the present invention.

In FIG. 1, symbol Mi denotes an injection unit of the injection molding machine M, while a mold-clamping unit is omitted. The injection unit Mi includes an injection cylinder 2. The rear end of a heating cylinder 11 is connected to the front end of the injection cylinder 2. An oil motor 12 for rotating a screw is connected to the rear end of the injection cylinder 2. An injection nozzle 13 is attached to the front end of the heating cylinder 11. A hopper 14 is disposed at a rear portion of the heating cylinder 11. The heating cylinder 11 accommodates an injection screw 15. The rear end of the injection screw 15 is connected to the front end of a rod portion 16r of a single-rod piston 16 accommodated in the injection cylinder 2. The interior of the injection cylinder 2 is divided into a front oil chamber 2f and a rear oil chamber 2r by means of the piston 16. A driving shaft 12s of the oil motor 12 is spline-connected to the rear end of the piston 16. Thus, the injection screw 15 is caused to advance/retreat by means of the injection cylinder 2 and is rotated by means of the oil motor 12.

The hydraulic circuit 1 includes a 4-port servo valve 4. The servo valve 4 drives and controls the injection cylinder 2 according to a received control signal and performs servo control with respect to the speed, pressure, and position of the injection screw 15. The A port of the servo valve 4 is connected to the front oil chamber 2f of the injection cylinder 2, and the B port of the servo valve 4 is connected to the rear oil chamber 2r of the injection cylinder 2. The P port of the servo valve 4 is connected to the discharge side of a hydraulic power unit 5 via a logic valve 21. The hydraulic power unit 5 includes a hydraulic pump 22, a pump motor 23 for driving the hydraulic pump 22, a filter 24 connected to the suction side of the hydraulic pump 22, a check valve 25 connected to the discharge side of the hydraulic pump 22, and an accumulator 26 connected to the secondary side of the check valve 25. The logic valve 21 is connected to the secondary side of the check valve 25 through a supply line 27. Reference numeral 28 denotes a selector valve. Through changing over of the selector valve 28, the pilot port of the logic valve 21 is selectively connected to the supply line 27 or an oil tank 3. The filter 24 is accommodated within the oil tank 3. The hydraulic pump 22 may be either a variable-delivery pump or a fixed-delivery pump.

The T port of the servo valve 4 is connected to the oil tank 3 via a shutoff valve 6. When the shutoff valve 6 is opened, the T port of the servo valve 4 communicates with the oil tank 3, thereby establishing a regular mode. When the shutoff valve 6 is closed, the T port of the servo valve 4 is shut off from the oil tank 3, thereby establishing a differential mode. The T port of the servo valve 4 is connected to the rear oil chamber 2r of the injection cylinder 2 via the logic valve 7. The pilot port of the logic valve 7 is also connected to the rear oil chamber 2r. Thus is configured a differential circuit 30. A relief valve 8 is installed in a line extending between the front oil chamber 2f of the injection cylinder 2 and the oil tank 3. Even when a surge pressure is generated in drain oil ejected from the front oil chamber 2f, the surge pressure is relieved, since the drain oil is returned to the oil tank 3 via the relief valve 8.

The operation of the hydraulic circuit 1 according to the first embodiment will next be described. First, the shutoff valve 6 is opened; i.e., the shutoff valve 6 is set to a right-side position represented by symbol R (hereinafter referred to as the R position) in FIG. 1, thereby establishing the regular mode. The T port of the servo valve 4 communicates with the oil tank 3 via the shutoff valve 6 set in the R position. In an injection step, first, the selector valve 28 is set to a left-side position represented by symbol L (hereinafter referred to as the L position) in FIG. 1 (the selector valve 28 is also set to the L position in the differential mode). The pilot port of the logic valve 21 communicates with the oil tank 3. Working fluid discharged from the hydraulic power unit 5 flows through the logic valve 21 and the servo valve 4 and is then supplied to the rear oil chamber 2r of the injection cylinder 2. Notably, in the hydraulic power unit 5, through operation of the hydraulic pump 22, pressure is accumulated in the accumulator 26. In the injection step, the servo valve 4 causes working fluid to be supplied to the rear oil chamber 2r of the injection cylinder 2 such that the injection screw 15 assumes a predetermined injection speed. All drain oil ejected from the front oil chamber 2f is returned to the oil tank 3 via the servo valve 4 and the shutoff valve 6 set in the R position.

When the shutoff valve 6 is closed; i.e., when the shutoff valve 6 is set to a left-side position represented by symbol L (hereinafter referred to as the L position) in FIG. 1, the differential mode is established. The T port of the servo valve 4 is shut off from the oil tank 3 by the shutoff valve 6 set in the L position. Accordingly, in the injection step, working fluid discharged from the hydraulic power unit 5 is supplied to the rear oil chamber 2r of the injection cylinder 2 via the servo valve 4. Drain oil ejected from the front oil chamber 2f is supplied to the primary side of the logic valve 7. The pressure of the primary side of the logic valve 7 increases with the amount of drain oil. Thus, when the pressure of the primary side becomes equal to or greater than the sum of a cracking pressure and the pressure of the secondary side of the logic valve 7, the logic valve 7 opens, permitting the drain oil to pass through the logic valve 7. The drain oil merges with working fluid discharged from the servo valve 4. The resultant mixture is supplied to the rear oil chamber 2r of the injection cylinder 2. Thus, injection at a relatively high flow rate of working fluid can be performed without an increase in the amount of working fluid supplied from the hydraulic power unit 5, thereby implementing an increase in injection speed, a reduction in the size of an oil line, and prevention of impact pressure.

At the time of stoppage of injection, a regular injection stoppage is performed by means of the servo valve 4. Since drain oil ejected from the front oil chamber 2f of the injection cylinder 2 is supplied to the rear oil chamber 2r via the servo valve 4, which constitutes a meter-out circuit, the servo valve 4 serves also as a braking circuit. Specifically, the drain oil which is supplied from the front oil chamber 2f to the rear oil chamber 2r by means of the differential circuit 30 flows at a low flow rate because of throttling effected by the servo valve 4, thereby effecting sufficient braking. Thus, there is no need for employing an additional braking circuit. Even when an additional braking circuit is to be employed, the braking circuit can be simplified. Therefore, the number of components of the hydraulic circuit 1 can be reduced with a resultant reduction in manufacturing cost. Also, control can be facilitated and stabilized, and proper and accurate braking control can be performed, thereby improving molding quality drastically. Even when a surge pressure is generated during braking, the surge pressure is relieved by means of the relief valve 8.

In transition from the injection step to a pressure-holding step, the shutoff valve 6 is set to the R position. As a result, the logic valve 7 communicates with the oil tank 3, and thus the pressure of the primary side of the logic valve 7 becomes lower than that of the secondary side. Therefore, the logic valve 7 closes, and the pressure of the front oil chamber 2f of the injection cylinder 2 decreases, thereby maintaining high holding pressure.

Next, a hydraulic circuit 1s according to a modification of the first embodiment will be described with reference to FIG. 2. In FIG. 1, the T port of the servo valve 4 is connected to the rear oil chamber 2r of the injection cylinder 2 via the logic valve 7. By contrast, in the modification, the T port of the servo valve 4 is connected to the P port of the servo valve 4 via the logic valve 7. Accordingly, in the differential mode, drain oil which passes through the logic valve 7 merges with working fluid at the P port of the servo valve 4. The resultant mixture flows through the servo valve 4 and is then supplied to the rear oil chamber 2r of the injection cylinder 2. The modification is basically similar to the first embodiment shown in FIG. 1 in that the servo valve 4 serves also as a braking circuit. In the modification, drain oil which passes through the logic valve 7 is supplied to the P port of the servo valve 4, so that all working fluid to be supplied to the rear oil chamber 2r undergoes flow control performed by the servo valve 4. Thus, braking performance is improved more than is in the case of the first embodiment. However, in the modification, since the pressure of the accumulator 26 is always applied to the P port of the servo valve 4, the pressure of the accumulator 26 is applied to the secondary side and the pilot port of the logic valve 7. Accordingly, in the injection step, the logic valve 7 opens under the condition that the pressure of the primary side thereof becomes equal to or greater than the sum of the pressure of the accumulator 26 and a cracking pressure, indicating that the injection piston advances while high pressure is maintained within the front oil chamber 2f of the injection cylinder 2. Therefore, the modification is inferior to the first embodiment in terms of durability of packing.

Figure 2:
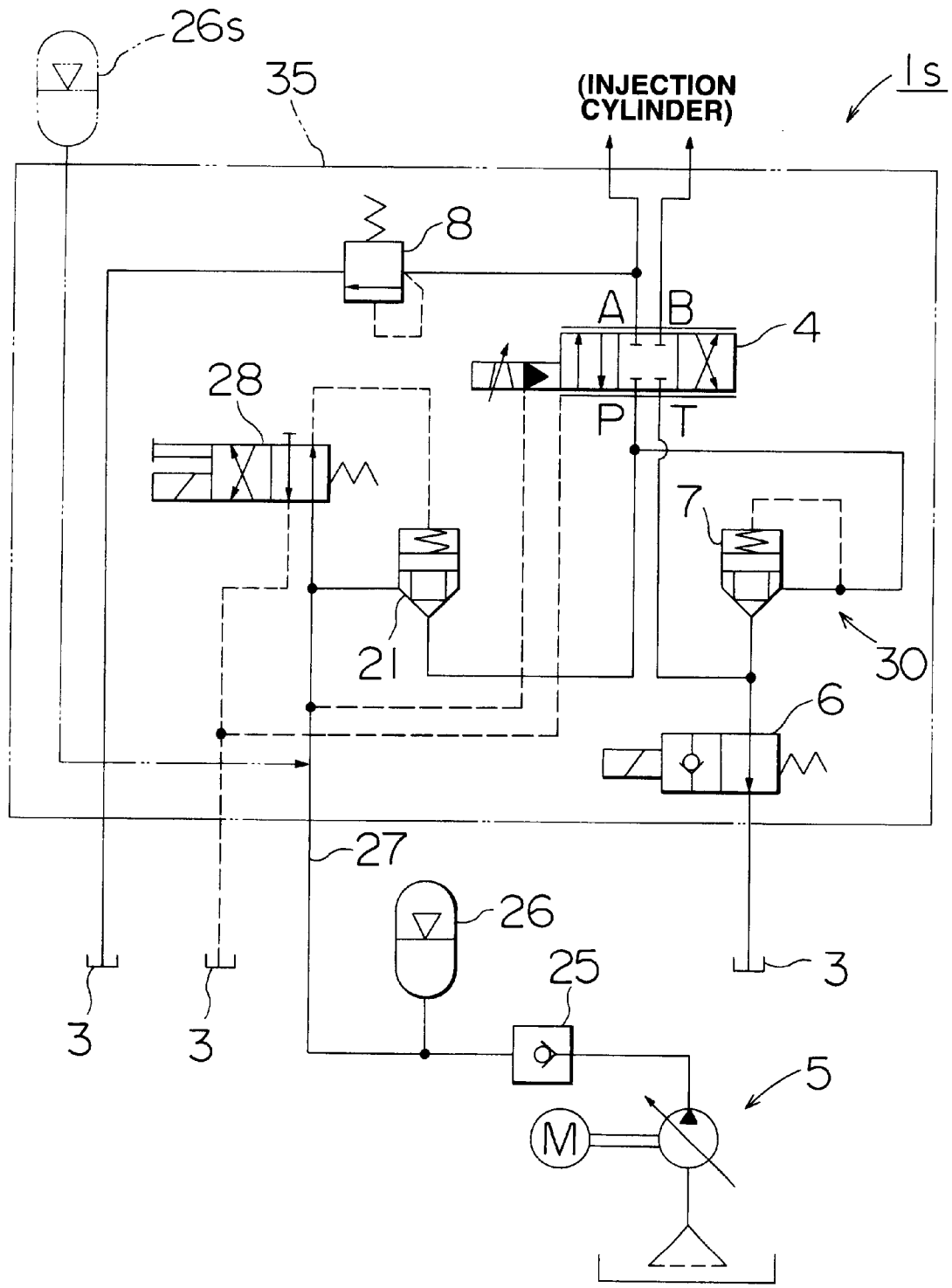
FIG. 2 is a block diagram of a hydraulic circuit according to a modification of the first embodiment.

As shown in FIG. 2, in the modification, a portion of the hydraulic circuit 1s which is enclosed by an imaginary line is formed as an injection manifold 35. As represented by an imaginary line 26s, the accumulator 26 can be directly attached to the injection manifold 35, thereby enabling a further reduction in the size of an oil line which connects the hydraulic power unit 5 and the injection manifold 35.

Figure 3:
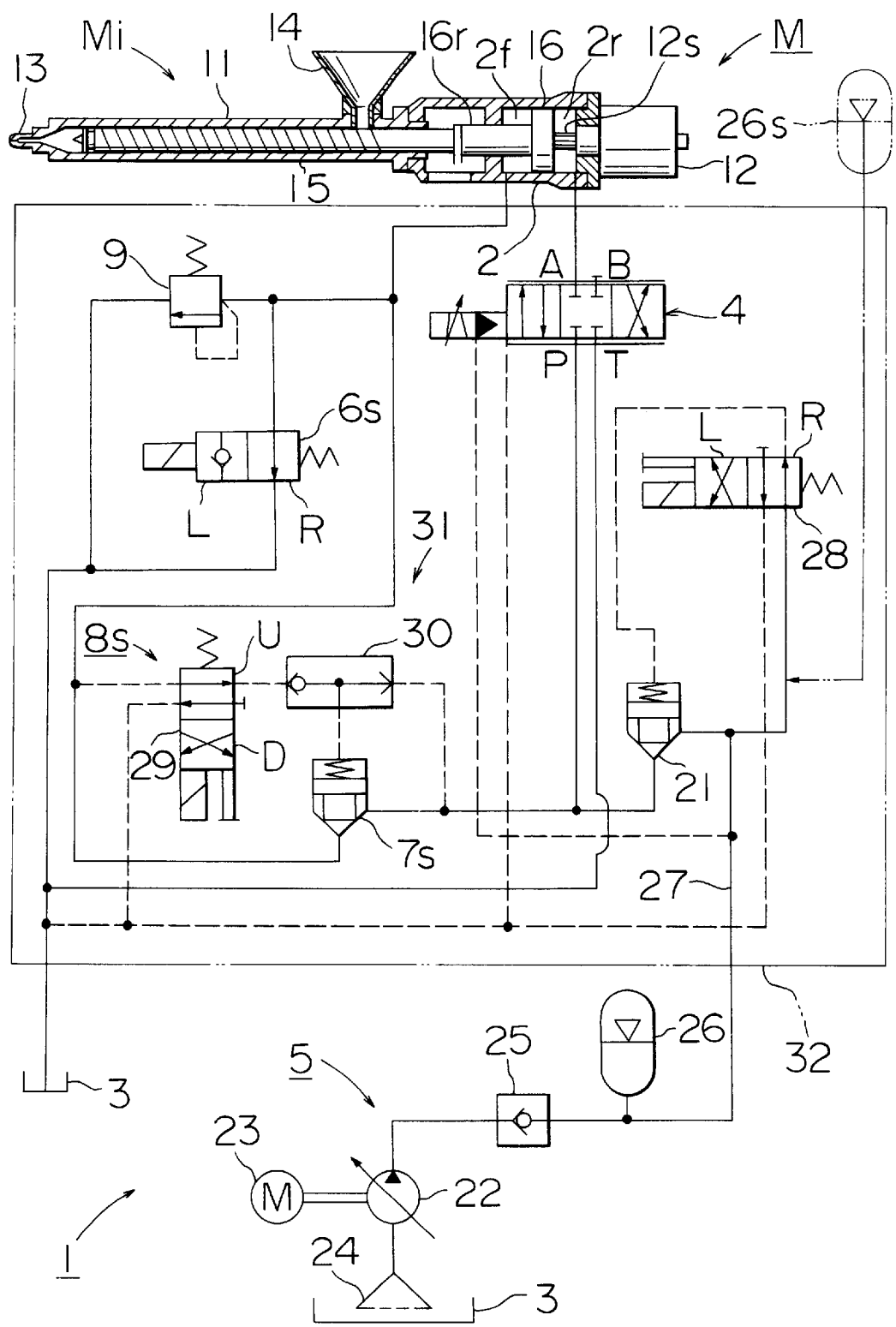
FIG. 3 is a block diagram of a hydraulic circuit according to a second embodiment of the present invention.
Figure 4:
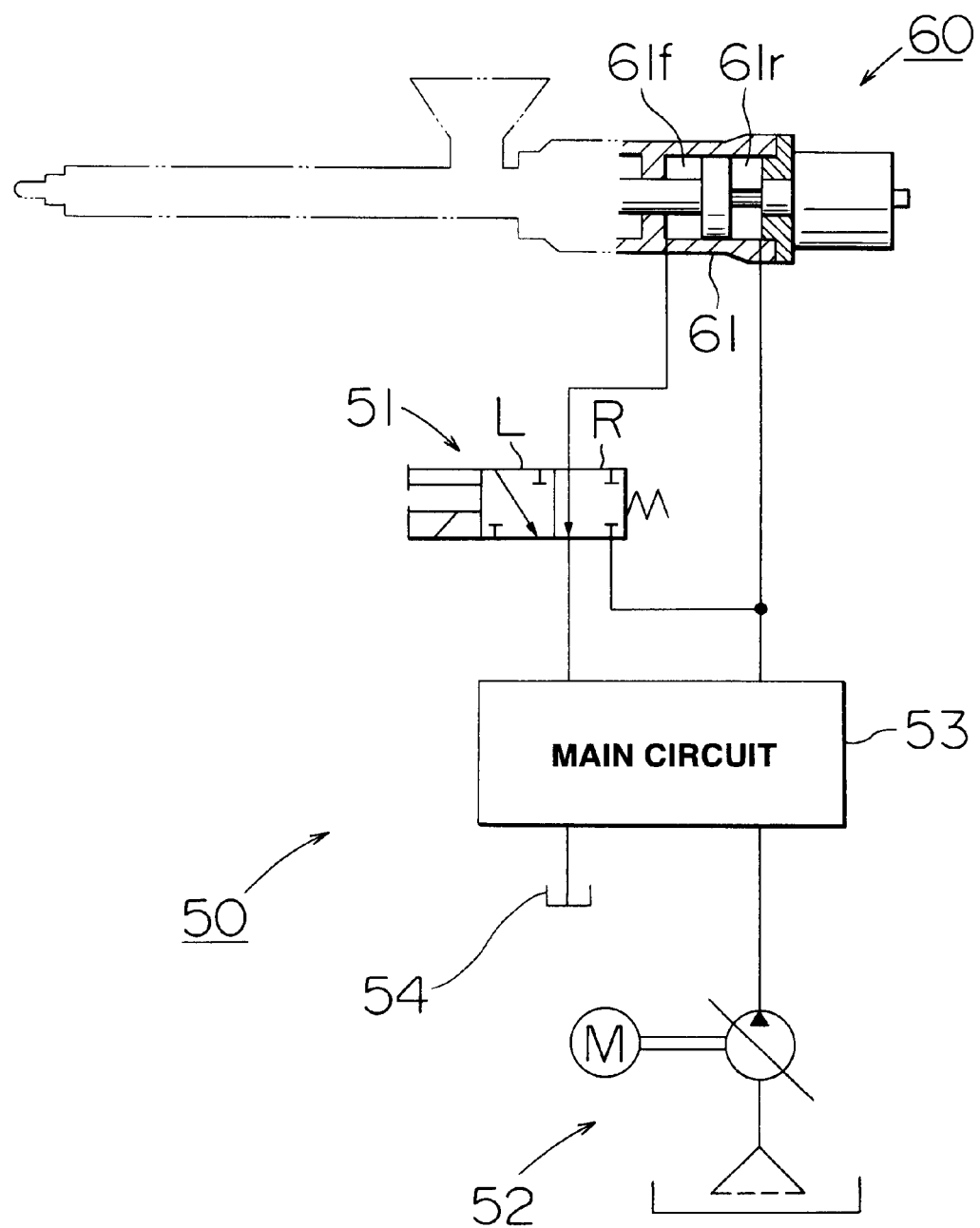
FIG. 4 is a schematic block diagram showing a simplified block diagram of a conventional hydraulic circuit for the purpose of illustrating the principle of the hydraulic circuit.

Next, FIG. 3 shows a hydraulic circuit 1 of an injection molding machine M according to a second embodiment of the present invention.

In FIG. 3, symbol Mi denotes an injection unit of the injection molding machine M, while a mold-clamping unit is omitted. The injection unit Mi includes an injection cylinder 2. The rear end of a heating cylinder 11 is connected to the front end of the injection cylinder 2. An oil motor 12 for rotating a screw is connected to the rear end of the injection cylinder 2. An injection nozzle 13 is attached to the front end of the heating cylinder 11. A hopper 14 is disposed at a rear portion of the heating cylinder 11. The heating cylinder 11 accommodates an injection screw 15. The rear end of the injection screw 15 is connected to the front end of a rod portion 16r of a single-rod piston 16 accommodated in the injection cylinder 2. The interior of the injection cylinder 2 is divided into a front oil chamber 2f and a rear oil chamber 2r by means of the piston 16. A driving shaft 12s of the oil motor 12 is spline-connected to the rear end of the piston 16. Thus, the injection screw 15 is caused to advance/retreat by means of the injection cylinder 2 and is rotated by means of the oil motor 12.

The hydraulic circuit 1 includes a 4-port servo valve 4. The servo valve 4 drives and controls the injection cylinder 2 according to a received control signal and performs servo control with respect to the speed, pressure, and position of the injection screw 15. The A port of the servo valve 4 is connected to the rear oil chamber 2r of the injection cylinder 2, and the P port of the servo valve 4 is connected to the discharge side of a hydraulic power unit 5 via a logic valve 21. The hydraulic power unit 5 includes a hydraulic pump 22, a pump motor 23 for driving the hydraulic pump 22, a filter 24 connected to the suction side of the hydraulic pump 22, a check valve 25 connected to the discharge side of the hydraulic pump 22, and an accumulator 26 connected to the secondary side of the check valve 25. The logic valve 21 is connected to the secondary side of the check valve 25 through a supply line 27. The T port of the servo valve 4 is connected to an oil tank 3, and the B port of the servo valve 4 is blocked. Reference numeral 28 denotes a selector valve. Through changing over of the selector valve 28, the pilot port of the logic valve 21 is selectively connected to the supply line 27 or the oil tank 3. The filter 24 is accommodated within the oil tank 3. The hydraulic pump 22 may be either a variable-delivery pump or a fixed-delivery pump.

The front oil chamber 2f of the injection cylinder 2 is connected to the oil tank 3 via a shutoff valve 6s and is connected to the P port of the servo valve 4 via a logic valve 7s. A selector circuit 8s is connected to the pilot port of the logic valve 7s and permits the logic valve 7s to close in the regular mode and to open in the differential mode. The selector circuit 8s includes a selector valve 29 and a shuttle valve 30s. One inflow port of the shuttle valve 30s is selectively connected to the primary side of the logic valve 7s or the oil tank 3. The other inflow port of the shuttle valve 30s is connected to the secondary side of the logic valve 7s. The outflow port of the shuttle valve 30s is connected to the pilot port of the logic valve 7s.

When the shutoff valve 6s is set to the R position (the shutoff valve 6s is opened) in FIG. 3, and the selector valve 29 is set to an upper-side position represented by symbol U (hereinafter referred to as the U position) in FIG. 3, the regular mode is established. The front oil chamber 2f of the injection cylinder 2 communicates with the oil tank 3. One inflow port of the shuttle valve 30s is connected to the primary side of the logic valve 7s. Thus, the pressure of a spring chamber of the logic valve 7s increases, so that the logic valve 7s closes. As a result, no oil flows from the primary side of the logic valve 7s to the secondary side. By contrast, when the shutoff valve 6s is set to the L position (the shutoff valve 6s is closed), and the selector valve 29 is set to a lower-side position represented by symbol D (hereinafter referred to as the D position), the differential mode is established. The front oil chamber 2f of the injection cylinder 2 is shut off from the oil tank 3. One inflow port of the shuttle valve 30s is connected to the oil tank 3. Thus, the pressure of the spring chamber of the logic valve 7s decreases, so that the logic valve 7s opens. As a result, oil flows from the primary side of the logic valve 7s to the secondary side; i.e., a differential circuit 31 is formed.

A relief valve 9 is installed in a line extending between the front oil chamber 2f of the injection cylinder 2 and the oil tank 3. Even when a surge pressure is generated in drain oil ejected from the front oil chamber 2f, the surge pressure is relieved, since the drain oil is returned to the oil tank 3 via the relief valve 9. A portion of the hydraulic circuit 1 which is enclosed by an imaginary line is formed as an injection manifold 32. As represented by an imaginary line 26s, the accumulator 26 can be directly attached to the injection manifold 32, thereby enabling a further reduction in the size of an oil line which connects the hydraulic power unit 5 and the injection manifold 32.

The operation of the hydraulic circuit 1 according to the second embodiment will next be described. In the regular mode, as described above, the shutoff valve 6s is set to the R position (the shutoff valve 6s is opened), and the selector valve 29 is set to the U position. Thus, the logic valve 7s is normally closed. In an injection step, first, the selector valve 28 is set to the L position (the selector valve 28 is also set to the L position in the differential mode). The pilot port of the logic valve 21 communicates with the oil tank 3. Working fluid discharged from the hydraulic power unit 5 flows through the logic valve 21 and the servo valve 4 and is then supplied to the rear oil chamber 2r of the injection cylinder 2. Notably, in the hydraulic power unit 5, through operation of the hydraulic pump 22, pressure is accumulated in the accumulator 26. In the injection step, the servo valve 4 causes working fluid to be supplied to the rear oil chamber 2r of the injection cylinder 2 such that the injection screw 15 assumes a predetermined injection speed. All drain oil ejected from the front oil chamber 2f is returned to the oil tank 3 via the shutoff valve 6s set in the R position.

In the differential mode, the shutoff valve 6s is set to the L position (the shutoff valve 6s is closed), and the selector valve 29 is set to the D position. Accordingly, in the injection step, working fluid discharged from the hydraulic power unit 5 is supplied to the rear oil chamber 2r of the injection cylinder 2 via the servo valve 4. Drain oil ejected from the front oil chamber 2f is supplied to the primary side of the logic valve 7s. The pressure of the primary side of the logic valve 7s increases with the amount of drain oil. Thus, when the pressure of the primary side becomes equal to or greater than the sum of a cracking pressure and the pressure of the secondary side of the logic valve 7s, the logic valve 7s opens, permitting the drain oil to pass through the logic valve 7s. The drain oil merges with working fluid discharged from the hydraulic power unit 5. The resultant mixture is supplied to the rear oil chamber 2r of the injection cylinder 2. Thus, injection at a relatively high flow rate of working fluid can be performed without an increase in the amount of working fluid supplied from the hydraulic power unit 5, thereby implementing an increase in injection speed, a reduction in the size of an oil line, and prevention of impact pressure.

At the time of stoppage of injection, a regular injection stoppage is performed by means of the servo valve 4. Since drain oil ejected from the front oil chamber 2f of the injection cylinder 2 is supplied to the rear oil chamber 2r via the servo valve 4, which constitutes a meter-out circuit, the servo valve 4 serves also as a braking circuit. Thus, there is no need for employing an additional braking circuit. Even when an additional braking circuit is to be employed, the braking circuit can be simplified. Therefore, the number of components of the hydraulic circuit 1 can be reduced with a resultant reduction in manufacturing cost. Also, control can be facilitated and stabilized, and proper and accurate braking control can be performed, thereby improving molding quality drastically. Notably, by setting the selector valve 29 to the U position, the logic valve 7s closes as does in the regular mode. As a result, the pressure of the front oil chamber 2f increases, thereby rapidly decelerating the piston 16. Also, even when a high surge pressure is generated during braking, the surge pressure is relieved by means of the relief valve 9.

In transition from the injection step to a pressure-holding step, the shutoff valve 6s is set to the R position, and the selector valve 29 is set to the U position. As a result, the front oil chamber 2f communicates with the oil tank 3, and the primary side or the secondary side, whichever higher in pressure, of the logic valve 7s is connected to the pilot port of the logic valve 7s. Therefore, the logic valve 7s closes, and the pressure of the front oil chamber 2f of the injection cylinder 2 decreases, thereby maintaining high holding pressure.

While the present invention has been described with reference to the preferred embodiments, the present invention is not limited thereto. Regarding structural details, shape, components, among others, modifications and any omission or addition may be possible as needed without departing from the scope of the invention. For example, the relief valve 8 (9) is not necessarily installed. The above embodiments are described while mentioning that, in the differential mode, all drain oil is supplied to the rear oil chamber 2r of the injection cylinder 2. However, a portion of drain oil may be supplied to the rear oil chamber 2r. The term "connect" implies not only direct connection to a target region but also connection to an oil line connected to the target region or connection to another region to which the oil line is connected.

What is claimed is:

1. A hydraulic circuit of an injection molding machine permitting selection of either a regular mode, in which all drain oil ejected from a front oil chamber of an injection cylinder during injection is returned to an oil tank, or a differential mode, in which all or a portion of the drain oil is supplied to a rear oil chamber of said injection cylinder during injection, said hydraulic circuit comprising:

a 4-port servo valve having A, B, P, and T ports and adapted to drive and control said injection cylinder, the A and B ports being connected to the front oil chamber and the rear oil chamber, respectively, of said injection cylinder, and the P port being connected to a hydraulic power unit;

a shutoff valve for selecting the regular mode or the differential mode, the T port of said servo valve being connected to said oil tank via said shutoff valve; and a logic valve, via which the T port of said servo valve is connected to the rear oil chamber of said injection cylinder.

2. A hydraulic circuit of an injection molding machine according to claim 1, wherein a relief valve is installed in a line extending between the front oil chamber and said oil tank.

3. A hydraulic circuit of an injection molding machine permitting selection of either a regular mode, in which all drain oil ejected from a front oil chamber of an injection cylinder during injection is returned to an oil tank, or a differential mode, in which all or a portion of the drain oil is supplied to a rear oil chamber of said injection cylinder during injection, said hydraulic circuit comprising:

a 4-port servo valve having A, B, P, and T ports and adapted to drive and control said injection cylinder, the A and B ports being connected to the front oil chamber and the rear oil chamber, respectively, of said injection cylinder, and the P port being connected to a hydraulic power unit;

a shutoff valve for selecting the regular mode or the differential mode, the T port of said servo valve being connected to said oil tank via said shutoff valve; and a logic valve, via which the T port of said servo valve is connected to the P port of said servo valve.

4. A hydraulic circuit of an injection molding machine according to claim 3, wherein a relief valve is installed in a line extending between the front oil chamber and said oil tank.

5. A hydraulic circuit of an injection molding machine permitting selection of either a regular mode, in which all drain oil ejected from a front oil chamber of an injection cylinder during injection is returned to an oil tank, or a differential mode, in which all or a portion of the drain oil is supplied to a rear oil chamber of said injection cylinder during injection, said hydraulic circuit comprising:

a servo valve, via which the rear oil chamber of said injection cylinder is connected to a hydraulic power unit;

a shutoff valve, via which the front oil chamber of said injection cylinder is connected to said oil tank; and a logic valve, via which the front oil chamber of said injection cylinder is connected to a P port of said servo valve.

6. A hydraulic circuit of an injection molding machine according to claim 5, wherein a selector circuit is connected to a pilot port of said logic valve and permits said logic valve to be closed in the regular mode and to be opened in the differential mode.

7. A hydraulic circuit of an injection molding machine according to claim 5, wherein a relief valve is installed in a line extending between the front oil chamber and said oil tank.

* * * * *